United States Patent [19]

Yoshifuji

[11] 4,411,168
[45] Oct. 25, 1983

[54] INNER CABLE

[75] Inventor: Junnosuke Yoshifuji, Takarazuka, Japan

[73] Assignee: Nippon Cable System, Inc., Hyogo, Japan

[21] Appl. No.: 235,570

[22] Filed: Feb. 18, 1981

[51] Int. Cl.³ .............................................. F16C 1/10
[52] U.S. Cl. .................................... 74/501 R; 74/422
[58] Field of Search ............. 74/501 R, 501 P, 424 L, 74/422

[56] References Cited

U.S. PATENT DOCUMENTS 2,067,815 1/1937 Barber et al. ........................ 74/501
2,211,790 8/1940 Pile ...................................... 74/501
2,821,092 1/1958 Cordora et al. ..................... 74/501

FOREIGN PATENT DOCUMENTS 445041 3/1966 Japan .

Primary Examiner—Kenneth Dorner
Attorney, Agent, or Firm—Armstrong, Nikaido, Marmelstein & Kubovcik

[57] ABSTRACT

In an inner cable comprising a core and teeth formed by spirally winding at least one metal wire on the outer surface of the core and inserted into a conduit, a hollow elastic member is disposed between the adjacent teeth in order to prevent the slidable contact of the teeth and the conduit during the operation of the inner cable, whereby the inner cable can be operated without generating the noise.

3 Claims, 7 Drawing Figures

INNER CABLE

BACKGROUND OF THE INVENTION

The present invention relates to an improved inner cable. More particularly, the present invention relates to the inner cable which can be operated by push-pull operation without generating a noise.

The inner cable is essentially formed by spirally winding at least one metal wire having a comparatively large diameter on the outer surface of a core comprising a metal strand at the same intervals to make teeth. The teeth of the inner cable are meshed with the other gear or the other similar inner cable (hereinafter referred to as an engagement element) to rotate the engagement element by the movement of the inner cable or to move the inner cable by the rotation of the engagement element.

Such an inner cable usually is flexible, and is inserted into a conduit to use as a control cable for the remote control of various industrial mechanisms. A flexible tube being a metal spiral tube or a non-flexible tube merely being a metal tube is used as a conduit, and is usually bent between the operating side and the working side.

When the inner cable is operated within such a conduit, the teeth of the inner cable are slidably contacted to the inner surface of the conduit made of metal. Especially, in the case that the conduit is bent, the above teeth discontinuously contact the inner surface of the conduit, and then generate the noise.

Also, the control cable comprising the inner cable and the conduit is often applied to, for example, shut and open of a sun roof, a window glass or the like in an automobile. In a cabin of the automobile, the noise makes a driver and passengers uncomfortable, even if that is small.

Since the noise generated by the frequent contact of the geared cable and the conduit due to the oscillation or vibration of the automobile is also included in the noise generated in the automobile, it is eagerly desired to prevent the noise generated in the control cable comprising the inner cable and the conduit.

In order to prevent the noise in such a control cable, it has been suggested that an inner tube made of synthetic resin is interposed between the inner cable and the conduit. However, there is drawback that the control cable produced is insufficient in preventing the noise, because the noise is generated by the slidable contact of the inner tube and the inner cable.

Also, it has been suggested that a brush-like layer comprising short fibers and having spring function is bonded to the outer surface of the core in the inner cable or the inner surface of the conduit (Japanese Patent Publication No. 5041/1969). However, the brush-like layer wears after a comparatively short term in use, and the noise is generated. In addition, the control cable suggested has the drawback that the function of the inner cable is prevented, because the short fibers come out from the bonded surface, and are stuffed between the geared cable and the conduit.

Furthermore, it has been suggested that an elastic foamed layer made of synthetic resin such as polyurethane is provided on the outer surface of the core between adjacent teeth, so that a top of that is projected outwardly more than those of the teeth (U.S. Ser. No. 63,402). Accordingly, the foamed layer is directly contacted with the conduit without the teeth being not contacted with the conduit, and therefore the noise can be effectively prevented. When the geared cable is meshed with the engagement element, the foamed layer is depressed by the tooth of the engagement element. In that case, there is drawback that the foamed layer is sandwiched between the tooth of the geared cable and that of the engagement element, and as a result, is torn off.

OBJECTS OF THE INVENTION

The main object of the present invention is to provide a inner cable which can prevent the generation of the noise as in the case that teeth of the inner cable is directly contacted to the outer surface of a conduit.

Other objects and advantages of the invention will become more apparent from the following descriptions and drawings.

DETAILED EXPLANATION OF THE INVENTION

Figure 1:
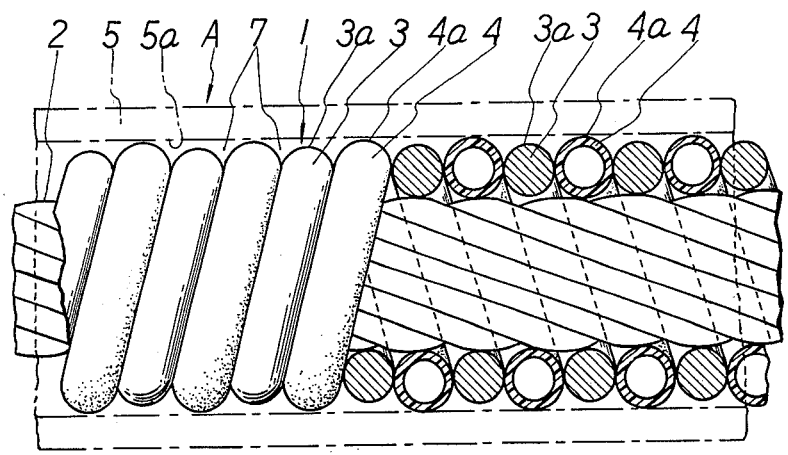
FIG. 1 is a schematically side view partially broken away for showing an embodiment of an inner cable of the present invention.

In FIG. 1, indicated as 1 is an inner cable comprising a core 2 formed by a metal strand and teeth 3 formed by spirally winding at least one metal wire on the outer surface of the core 2 at the same intervals.

Indicated as 4 is a hollow elastic member which is spirally wound on the outer surface of the core 2 so as to position between the adjacent teeth 3, and if necessary, may be bonded to the core 2. An outer diameter of the hollow elastic member 4 is larger than that of the core 2, whereby each top portion 4a of the hollow elastic member 4 is outwardly projected higher than each top portion 3a of the teeth 3.

The inner cable 1 of the invention is inserted into a conduit 5 which is a flexible metal helical tube or a non-flexible metal tube. In that case, each top portion 3a of the teeth 3 does not contact to the inner surface 5a of the conduit 5, but only each top portion 4a of the hollow elastic member 4 contacts to the inner surface 5a.

Figure 4:
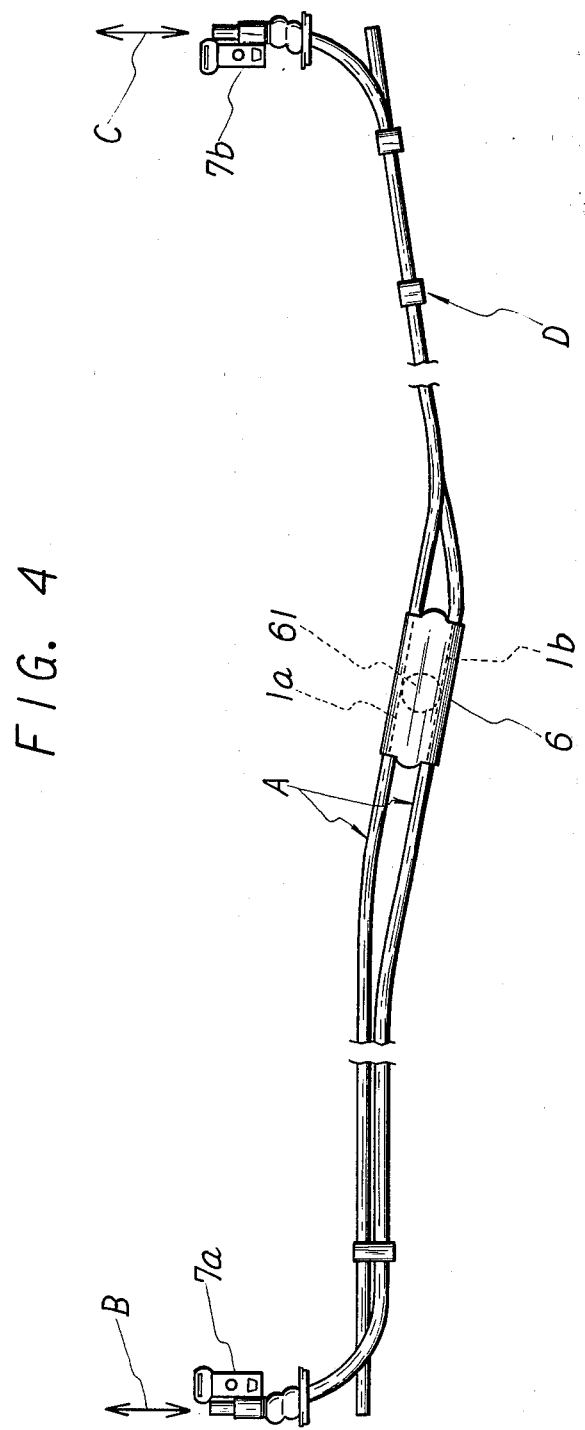
FIG. 4 is a schematically front view for showing an experimental device used in Example of the present invention.

Accordingly, when the inner cable 1 is slidably moved in the conduit 5 in the axial direction or rotational direction thereof, only the top portions 4a of the hollow elastic member 4 slidably contact to the inner surface 5a of the conduit 5, whereby the inner cable is free from the noise which is generated by contact of the teeth 3 and the conduit 5. Also, in the case that a control cable A comprising the conduit 5 and the above inner cable 1 is curved as shown in FIG. 4, the hollow elastic member 4 in the inner surface of the curved portion is sandwiched between the adjacent teeth 3, and is depressed by them so as to project more outwardly than the top portion 3a of the teeth. As a result, the noise in the inner surface of the curved portion in which the inner cable 1 is strongly contacted to the inner surface 5a of the conduit 5 can be significantly prevented, and further the teeth 3 are not slidably contacted to the inner surface 5a. Similarly, even if the control cable A receives the oscillation, it is apparent that the control cable A is free from the noise.

Also, when the inner cable 1 of the invention is meshed with another engagement element (not shown), the hollow elastic member 4 positioning between each tooth 3 is depressed by the engagement element, and therefore the mesh of both the inner cable 1 and the engagement element can be carried out without any trouble, because the hollow elastic member 4 is deformed as if it flows away to other portions, when receiving pressure.

The above hollow elastic member 4 in the invention can be obtained by molding plastic or rubber material such as nylon, polyurethane or the mixture of them to a hollow tube. Such a hollow elastic member 4 preferably has a certain outer diameter so that the top portion 4a of the elastic member 4 wound on the core 2 is outwardly projected higher than those of the teeth 3, and is slightly contacted to the inner surface 5a of the conduit 5. For example, when a 2.55 mm. outer diameter core 2 having a 1.1 mm. outer diameter teeth 3 wound thereon is inserted into a 5.9 mm. inner diameter conduit 5, the outer diameter of the hollow elastic member 4 is preferably adopted in a range of 1.15 to 1.25 mm.

Also, the thickness of the hollow elastic member 4 largely affects an elasticity required to the elastic member 4. For example, in the case that the geared cable 1 is imposed on a specially large tension load, the hollow elastic member 4 is preferably formed at a large thickness so as to strengthen the elasticity. When the hollow elastic member 4 has the above outer diameter range against each diameter of the core 2, the teeth 3 and the conduit 5, the thickness of the elastic member 4 is usually adopted in a range of 0.05 to 0.5 mm.

Figure 2:
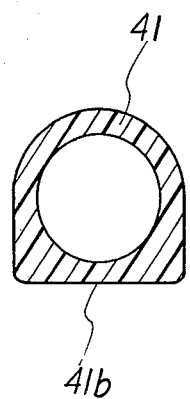
FIGS. 2 to 3 are schematically sectional views for showing other embodiments of a hollow elastic member in the present invention.
Figure 3:
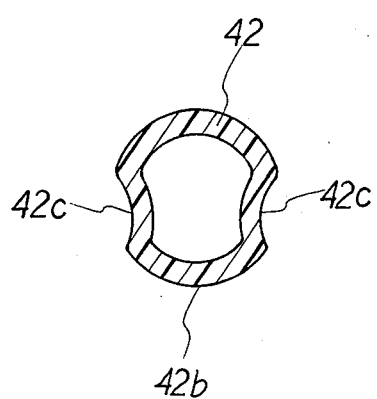

The hollow elastic member 4 in the invention is not limited to only a circular shape in section, but may be formed in various shapes such as a nearly half circle shape in section as shown in FIG. 2 or a nearly cocoon shape in section as shown in FIG. 3.

In a hollow elastic member 41 shown in FIG. 2, a bottom 41b contacting the core 2 (shown in FIG. 1) is flat, and therefore since the elastic member 41 is strongly bonded to the core 2 at the bottom 41b, the elastic member 41 does not move against the core 2 in the spiral direction thereof, when the inner cable is rotated.

In a hollow elastic member 42 shown in FIG. 3, due to the cocoon shape in section, the elastic member 42 can be engaged at the side concave surface 42c thereof with the tooth 3 shown in FIG. 1. As a result, when the elastic member 42 is wound between the adjacent teeth 3 so that a bottom 42b of it contacts the core 2, the elastic member 42 does not outwardly release from the teeth 3, and accordingly the inner cable can be easily produced.

These hollow elastic members 41 and 42 shown in FIGS. 2 to 3, of course, also have a significant effect in preventing the noise as in the embodiment shown in FIG. 1.

Furthermore, though not shown, the certain tube having a hollow triangle shape in section may be employed as a hollow elastic member.

In winding the hollow elastic member 4, 41, 42 on the outer surface of the core 2, the elastic member 4, 41, 42 is preferably wound with a heat setting so as to closely contact on the outer surface of the core 2.

A lubricant agent such as silicone oil is preferably either injected into the clearance between the geared cable 1 and the conduit 5, or is applied on the geared cable or the inner surface 5a of the conduit 5, in order to hold the lubricant agent in a number of clearances 7 formed between the inner cable 1 and the conduit 5. Thus, the control cable A reducing the slipping resistance and improved in the endurance for a long time of period can be provided.

The present invention is more particularly described and explained by means of the following Example and Comparative Examples.

EXAMPLE

An inner cable was produced by spirally winding a hollow elastic member, made of polyurethane, of 1.2 mm. in outer diameter and 0.6 mm. in inner diameter on a 2.55 mm. outer diameter core so as to position between adjacent teeth formed by spirally winding a 1.1 mm. diameter iron wire on the core at a pitch of 2.54 mm.

A control cable was produced by inserting the inner cable obtained into a stainless conduit of 7.0 mm. in outer diameter and 5.9 mm. in inner diameter.

An experimental device as shown in FIG. 4 was assembled to experiment the generation of noise in the control cable obtained.

In FIG. 4, a casing 6 having a gear 61 of 6 mm. in outer diameter is fixed to two control cables A at nearly center portions of them, and fittings 7a and 7b are provided at each one end of the control cables A respectively. The gear 61 is rotatably mounted on the casing 6, and is meshed with the inner cables 1a and 1b at the both side thereof opposing each other.

Thus, when each one end of the inner cables 1a and 1b is moved by push-pull operation with a certain stroke, the gear 61 is rotated. In this Example, the inner cables 1a and 1b were operated at a 350 mm. stroke and a 3.5 kg./cm. load with a rate of 10 strokes per minute.

Figure 5A:
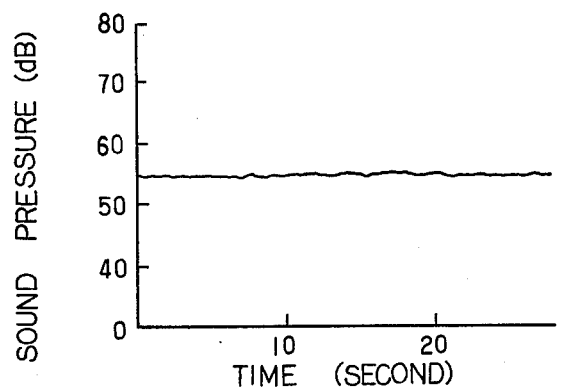
FIGS. 5(a) to (c) are graphs for showing the experimental results in Example and Comparative Examples of the present invention.

The noise generated during push-pull operations of the inner cables 1a and 1b was measured by contacting a microphone (not shown) to the certain position D, and was estimated by sound pressure (dB) measured by a commercially-available noise meter (type 1015) manufactured by Japan Electronic Instrument Co., Ltd. The result obtained is shown in FIG. 5(a).

Comparative Example 1

A control cable was produced in the same manner of Example except that a brush-like layer formed by bonding short fibers made of 6-nylon and being a 1.5 mm. length and a 3 denier thickness at a density of 200 fibers per $mm.^2$ on the outer surface of the core between the adjacent teeth instead of the hollow elastic member.

Figure 5B:
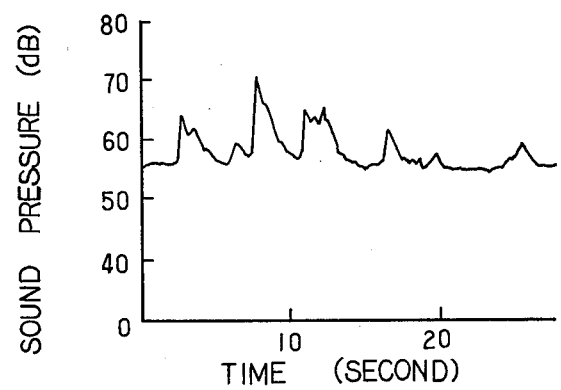

Two control cables obtained were incorporated into the device shown in FIG. 4, and the sound pressure (dB) was measured in the same manner of Example. The experimental result is shown in FIG. 5(b).

Comparative Example 2

A control cable was produced in the same manner of Example except that the hollow elastic member was not employed.

Two control cables obtained were incorporated into the device shown in FIG. 4, and the sound pressure (dB) was measured in the same manner of Example. The experimental result is shown in FIG. 5(c).

Figure 5C:
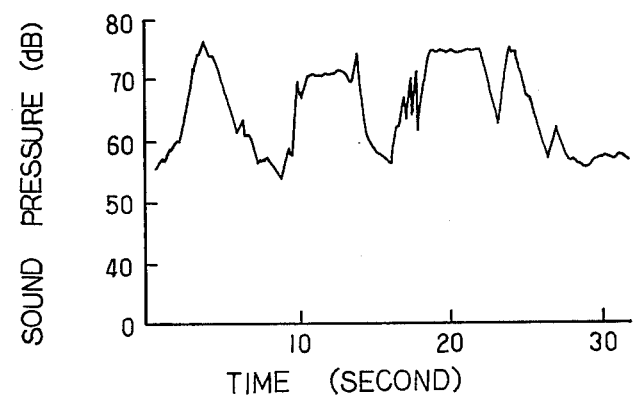

It is obvious from FIGS. 5(a) to (c) that the inner cable in Example can significantly prevent the noise more than the inner cables in Comparative Examples 1 and 2. In FIGS. 5(a) to (c), each sound pressure includes a back ground noise of 38 dB.

What is claimed is:

1. In an inner cable comprising a core and teeth formed by spirally winding at least one metal wire on the outer surface of the core at the same intervals, the improvement which comprises:

a hollow plastic member which is made of synthetic resin, is deformable in accordance with depression pressure of opposed tooth members, is restorable to an original form after removal of said pressure, and is spirally wound on the outer surface of the core so as to be positioned between the adjacent teeth, a top portion of said elastic member projecting outwardly higher than those of said adjacent teeth, whereby when said inner cable and an inner surface of a conduit into which said inner cable is inserted slideably in contact together, noise is reduced and when said adjacent teeth mesh with said opposed tooth members, said hollow elastic member between said adjacent teeth is deformed by said opposed tooth members to an extent so as not to prevent the meshing.

2. The inner cable of claim 1, wherein said hollow elastic member is bonded to the core.

3. The inner cable of claim 1, wherein said hollow elastic member is closely wound on the core with a heat setting.

* * * * *